US012694290B2

(12) United States Patent
Schmitt

(10) Patent No.: US 12,694,290 B2
(45) Date of Patent: Jul. 28, 2026

(54) METHOD FOR CONTROLLING AN AGENT

(71) Applicant: Robert Bosch GmbH, Stuttgart (DE)

(72) Inventor: Felix Schmitt, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 862 days.

(21) Appl. No.: 18/045,382

(22) Filed: Oct. 10, 2022

(65) Prior Publication Data

US 2023/0128941 A1 Apr. 27, 2023

(30) Foreign Application Priority Data

Oct. 21, 2021 (DE) .................... 10 2021 211 909.3

(51) Int. Cl.
*G06N 3/08* (2023.01)
*G06N 7/01* (2023.01)

(52) U.S. Cl.
CPC ................. *G06N 3/08* (2013.01); *G06N 7/01* (2023.01)

(58) Field of Classification Search
None
See application file for complete search history.

(56) References Cited

U.S. PATENT DOCUMENTS 11,886,993 B2 * 1/2024 Qi ........................... G06N 3/08
12,166,688 B2 * 12/2024 Jain .................... H04L 41/5019

2020/0104680 A1 * 4/2020 Reed ...................... G06N 3/006
2020/0104684 A1 * 4/2020 Vecerik ................... G06F 17/18
2023/0294276 A1 * 9/2023 Chao ....................... B25J 9/163
700/250

OTHER PUBLICATIONS

Nguyen et al., "A Model of Generating and Predicting Intention toward Human-Robot Cooperation", Nov. 6, 2018, IEEE, 2018 27th IEEE International Symposium on Robot and Human Interactive Communication (RO-MAN) (2018, pp. 113-120) (Year: 2018).*
"Value Refinement Network (VRN)", ICLR 2022 (2022) pp. 1-16.
Wohlke et al. "Value Refinement Network (VRN)", ICLR 2022 Conference (2022) pp. 1-13.

* cited by examiner

*Primary Examiner* — Davoud A Zand
(74) *Attorney, Agent, or Firm* — NORTON ROSE FULBRIGHT US LLP

(57) ABSTRACT

A method for controlling an agent. The method includes training a neural network using training data that contain, for a multiplicity of agents, examples of a behavior of the agents, the output of the neural network including a prediction of a behavior and being a function of network parameters that are trained in common for all training data, and being a function of a further parameter that is trained individually for each of the agents of the multiplicity of agents; fitting of a probability distribution to the values of the further parameter for the agents that result from the training; sampling a value from the probability distribution for a further agent in the environment of the agent; and controlling the agent, taking into account a prediction of the behavior of the further agent that the neural network outputs for the sampled value for the further agent.

7 Claims, 3 Drawing Sheets

300 train neural networ 301 fit probability distribution 302 sample value for a further agent 303 control agent 304

METHOD FOR CONTROLLING AN AGENT

CROSS REFERENCE

The present application claims the benefit under 35 U.S.C. § 119 of German Patent Application No. DE 10 2021 211 909.3 filed on Oct. 21, 2021, which is expressly incorporated herein by reference in its entirety.

FIELD

The present invention relates to methods for controlling an agent.

BACKGROUND INFORMATION

In the area of autonomous systems, the prediction of the behavior of moving objects (e.g., persons) in the environment of a controlled agent (such as a robot) is an important task in order to reliably control the agent and for example to avoid collisions.

In particular the prediction of human behavior in the near future, from one to 10 seconds, is an elementary task. For example, a hospital robot has to predict the movement of staff, doctors, and patients, in order to create space for them in a corridor in a timely manner. In autonomous driving, a vehicle has to anticipate the merging into traffic of other traffic participants. Currently, the most accurate prediction methods fall, almost without exception, into the category of machine learning.

One of the challenges in this task is that human behavior depends on individual desires, preferences, and intentions, and can therefore take many forms. For example, a driver may prefer not to pass a slower vehicle traveling in front, preferring instead to adapt their own speed, while another driver may wish not to lose time, and would prefer to pass the slower vehicle. For accurate predictions, this behavioral bandwidth has to be covered, and, in the case of machine learning approaches, has to be learned from data.

For this purpose, the currently leading methods in machine learning use variants of the variational auto-encoder (VAE) approach. Here it is assumed that the quantity to be predicted $y \sim p(\cdot|x,z)$ is a function not only of the input data x but also of a latent variable z that follows a prior distribution $p(z)$. This quantity is not directly present in the training data, but has to be estimated. For this purpose, the posterior $p(z|x,y)$ is used. For the training, $p(y|x,z)$ is modeled by a decoder network $g_\theta(y,x,z)$ and $p(z|x,y)$ is modeled by a recognition network $h_\psi(z,x,y)$ and they are trained by minimization of the Evidence Lower Bound (ELBO) $ELBO(x,y,\theta,\psi)=-KL(h_\psi(z,x,y)\|p(z))+E_{z \sim h_\psi(x,y,z)}[\log (g_\theta(y,x,z))]$. Here, KL designates the Kullback-Leibler divergence between distributions, and is used to regularize the latent variables or their distribution. The second part of the ELBO is called the reconstruction loss, and is used to train the decoder to make the best possible predictions.

Using this approach, some complex probability distributions can be modeled very well. However, the successful use of this method is difficult: for example, in VAE there are problems with overregularization that make necessary a precise setting of the hyperparameters of the algorithm, in particular a weighting of the Kullback-Leibler term, in the ELBO. Moreover, due to the fact that the training for the calculation of the reconstruction loss requires drawing additional random variables, a VAE is more difficult to train than conventional neural networks.

Correspondingly, control methods for agents are desirable that contain an efficient prediction of an object (detected in the environment of the agent).

SUMMARY

According to various specific example embodiments of the present invention, a method is provided for controlling an agent, including training of a neural network using training data that contain, for a multiplicity of agents, examples of a behavior of the agents, the output of the neural network having a prediction of a behavior and being a function of network parameters that are trained in common for all training data, and being a function of a further parameter that is trained individually for each of the agents of the multiplicity of agents; fitting a probability distribution to the values of the further parameter for the agents that result from the training; sampling a value from the probability distribution for a further agent in the environment of the agent; and controlling the agent, taking into account a prediction of the behavior of the further agent that the neural network outputs for the sampled value for the further agent.

In the context of the controlling of an autonomous system, the method described above according to the present invention may enable the generation of various probable behavior patterns of other agents (in particular human agents). In this way, in the controlling of the autonomous system trajectories or individual patterns of behavior can be determined that avoid collisions with the other agents, or other impairments to the other agents.

On the other hand, in the development phase of an autonomous system various behaviors of the human agents can be generated, so that the correct functioning of the autonomous system can be tested in a simulation-based evaluation (i.e., simulated controlling).

The method according to the present invention may enable the taking into account of the behavior of objects in the controlling of agents by using a behavior prediction that can be effectively trained. It can be implemented using established components (neural network, probability model), and the setting of the hyperparameters is significantly easier, and the training is more robust overall, than for example in a VAE approach. As a result, for example the models can be quickly and easily subsequently trained for new cases of applications such as the prediction of driver behavior in a different country; that is, an agent can quickly adapt to changed conditions, which for example increases safety in the case of autonomous driving.

In the following, various exemplary embodiments are indicated.

Exemplary embodiment 1 is a method for controlling a robot, as described above.

Exemplary embodiment 2 is the method according to exemplary embodiment 1, the neural network being trained to map an input of the neural network onto a prediction of the behavior of an agent, the input of the neural network including state information of the agent for which the neural network is to predict the behavior, and the further parameter.

The functional dependence of the output of the neural network on the further parameter can thus easily be achieved in that the further parameter is added to the input of the neural network (as a trainable part of the input). In this way, for the implementation no particular network architecture is required; rather, an existing network architecture can be used with corresponding dimensioning of the input.

Exemplary embodiment 3 is the method according to exemplary embodiment 2, the input of the neural network including state information about a control scenario in which the behavior of the agent is to be predicted.

In this way, the neural network can include the state of the control scenario in its prediction. The input of the neural network can for example be the input of a traffic situation in the form of a list of vehicles with their position and speed, supplemented with the additional parameters.

Exemplary embodiment 4 is the method according to one of the exemplary embodiments 1 through 3, the probability distribution being a Gaussian mixture model.

A Gaussian mixture model can be efficiently trained in order to model complex distributions, and sampling from the model can be done efficiently.

Exemplary embodiment 5 is the method according to one of exemplary embodiments 1 through 4, including training of the network parameters and of the additional parameter by adapting the network parameters and the additional parameter in order to minimize a loss between the examples of the behavior of the agents and the behavior respectively predicted by the neural network.

In other words, the further parameter is included in a training of the neural network. However, the further parameter here has different (trainable) values for training examples of different agents, because it is individually trained for each agent for which the training data contain examples of the behavior.

Exemplary embodiment 6 is a control device that is set up to carry out a method according to one of exemplary embodiments 1 through 5.

Exemplary embodiment 7 is a computer program having commands that, when they are executed by a processor, cause the processor to carry out a method according to one of exemplary embodiments 1 through 5.

Exemplary embodiment 8 is a computer-readable medium that stores commands that, when they are executed by a processor, cause the processor to carry out a method according to one of exemplary embodiments 1 through 5.

In the figures, similar reference characters generally relate to the same parts in all the different views. The figures are not necessarily to scale; instead, in general the emphasis is on the presentation of the principles of the present invention. In the following description, various aspects are described with reference to the figures.

DETAILED DESCRIPTION OF EXAMPLE EMBODIMENTS

The following detailed description relates to the figures that, for explanation, show specific details and aspects of the present disclosure in which the present invention can be realized. Other aspects may be used, and structural, logical, and electrical modifications may be carried out, without departing from the scope of protection of the present invention. The various aspects of the present disclosure do not necessarily mutually exclude one another, because some aspects of the present disclosure may be combined with one or more other aspects of the present disclosure in order to form new aspects of the present invention.

In the following, various examples are described in more detail.

Figure 1:
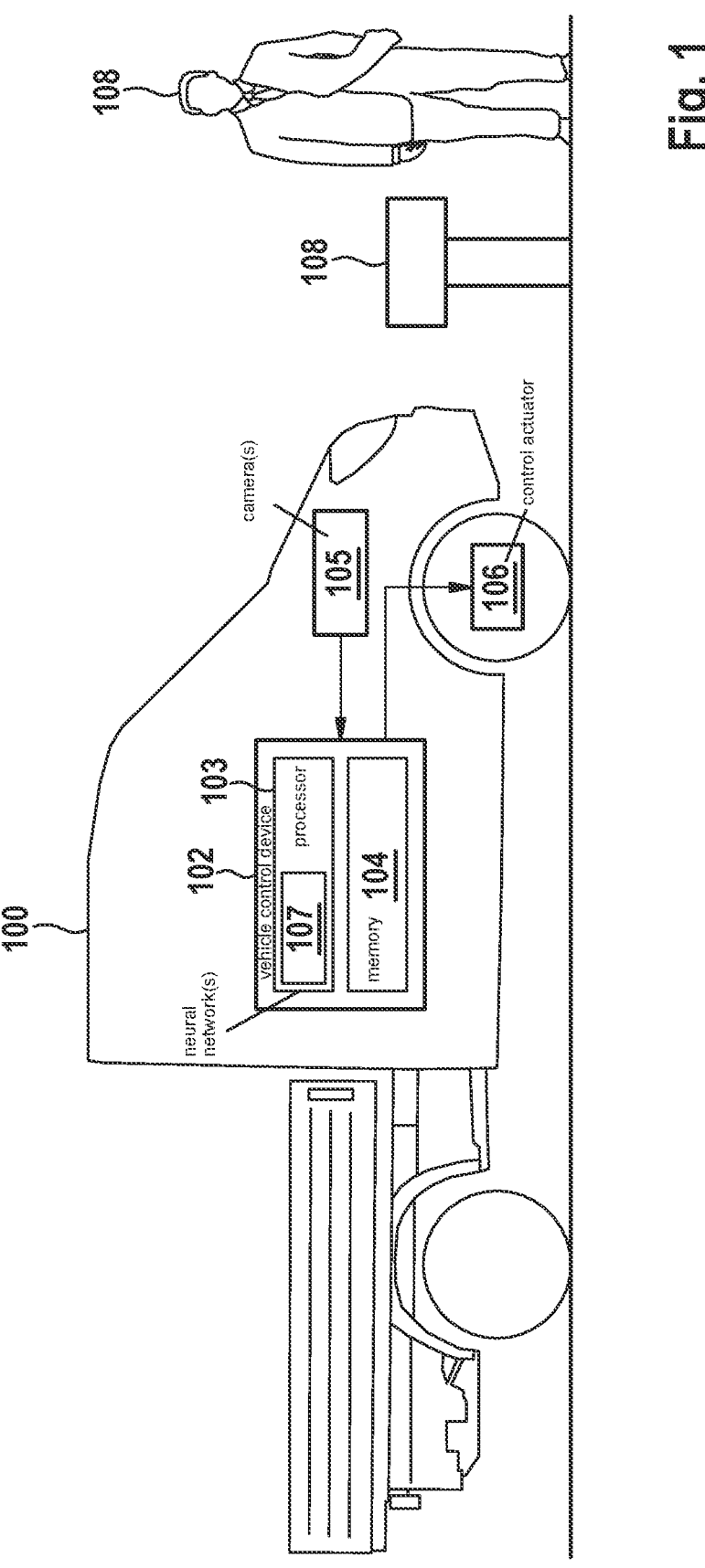
FIG. 1 shows a vehicle according to an example embodiment of the present invention.

FIG. 1 shows a vehicle 101.

In the example of FIG. 1, a vehicle 101, for example a passenger car or a truck, is provided with a vehicle control device 102.

Vehicle control device 102 has data processing components, e.g. a processor (e.g., a CPU) 103 and a memory 104 for storing control software according to which vehicle control device 102 operates, and data that are processed by processor 103.

For example, the stored control software (computer program) has instructions that, when the processor executes them, cause processor 103 to implement one or more neural networks 107.

The data stored in memory 104 can for example contain image data that are acquired by one or more cameras 105. The one or more cameras 105 can for example record one or more grayscale or color photos of the environment surrounding vehicle 101.

Using the image data (or also data from other information sources, such as other types of sensors, or also vehicle-vehicle communication), vehicle control device 102 can detect objects 108 in the surrounding environment of vehicle 101, in particular other vehicles, pedestrians, i.e., persons, or animals.

Vehicle control device 102 can examine the sensor data and can control vehicle 101 according to the results, i.e. can ascertain control actions for the vehicle and signal them to respective actuators of the vehicle. Thus, vehicle control device 102 can for example control actuator 106 (e.g., a brake) in order to control the speed of the vehicle, e.g., in order to brake the vehicle.

In the case of movable objects 108 in the environment, i.e. objects that move themselves, for an effective controlling it is necessary for vehicle control device 102 to predict how objects 108 will move. For example, vehicle control device 102 should be capable of predicting whether a person is stepping into the street or getting into another vehicle.

For this purpose, vehicle control device 102 carries out a behavioral prediction for humans, such as drivers or pedestrians, but also, e.g., for animals, or possibly also for other autonomous devices. In the following, these movable objects are also regarded as (other or further) agents that are present in the environment of the controlled agent, alongside the controlled agent. For the training of the behavior prediction model, a training data set is used that contains data (i.e., training examples) for the other agents that represent their behavior; e.g., for various traffic scenarios, the trajectories with which the agents have moved in the traffic scenarios.

According to various specific embodiments, for the behavior prediction an approach is used that is based on the assumption that the variability in behavior is determined above all by the different preferences of the human agents. These preferences can be assumed to be constant for example for a period of time of one to 10 seconds. Correspondingly, according to various specific embodiments the prediction model, as realized by a decoder in a VAE-based approach, is expanded by a vector $z$ of the preferences.

However, here the complex architecture needed for the training in VAE approaches is avoided. In contrast, the vector z is treated as a separate and trainable parameter $z_a$ of the model for each other agent a for which the training data set contains data. As long as a plurality of training examples are present in the training data for each agent, the dimension of z is sufficiently low (e.g. as is standard in VAEs), and a regularization technique such as weight decay is used, these $z_a$ can be learned.

In order to enable prediction to be carried out for new agents as well, i.e., for agents for which the training data set does not contain any data, the learned values of $z_a$ are collected after the training and, in an additional, second step, a distribution model is estimated for the data set of the $z_a$. For this purpose, various established methods for fitting probability models to data may be used from which random variables can be efficiently drawn, such as a Gaussian mixture model. By drawing from such a probability distribution, possible preferences can then be determined for new agents, and using the prediction model a possible behavior can be generated.

Thus, instead of a complex training procedure as in a VAE-based prediction approach, in two steps respectively comparatively simple training methods, each having established and stable routines, are used.

According to various specific embodiments, the control device of an agent, e.g. in the case of vehicle 101 vehicle control device 102, thus carries out a behavior prediction for another agent. This means that for an agent a (different from the controlled agent), the control device predicts its behavior y based on input data x. Here the variable x, depending on the specific application, can be a vector of input data, a matrix that contains a time series of input data, or a multichannel image. The same holds for the output y.

According to various specific embodiments, for this purpose a prediction model is used whose input data x (which indicate for example position, etc.) are expanded by an element $z_a$ whose value is learned individually for each agent for which the training data contains training examples. In the case of a vector of input data or a time series, the value (possibly a vector of values) of $z_a$ can easily be appended to x. In the case of images as input data, additional channels having constant values corresponding to the values of $z_a$ can be created.

The thus expanded input data of the prediction model are designated $\bar{x}=[x,z_a]$. According to various specific embodiments, the prediction model for predicting the variable y is realized by a neural network $f_{\bar{\theta}}(x)$, where $\bar{\theta}$ designates the trainable parameters. The neural network can determine a distribution for y or can directly determine a value for y. Differing from approaches such as a VAE-based approach, however, the variables $z_a$ are a part of the trainable parameters $\bar{\theta}$. This can also be realized in that an existing network architecture $f_\theta(x)$ is expanded to the input data $\bar{x}$ and $f_{\bar{\theta}}(\bar{x})$ is set.

Figure 2:
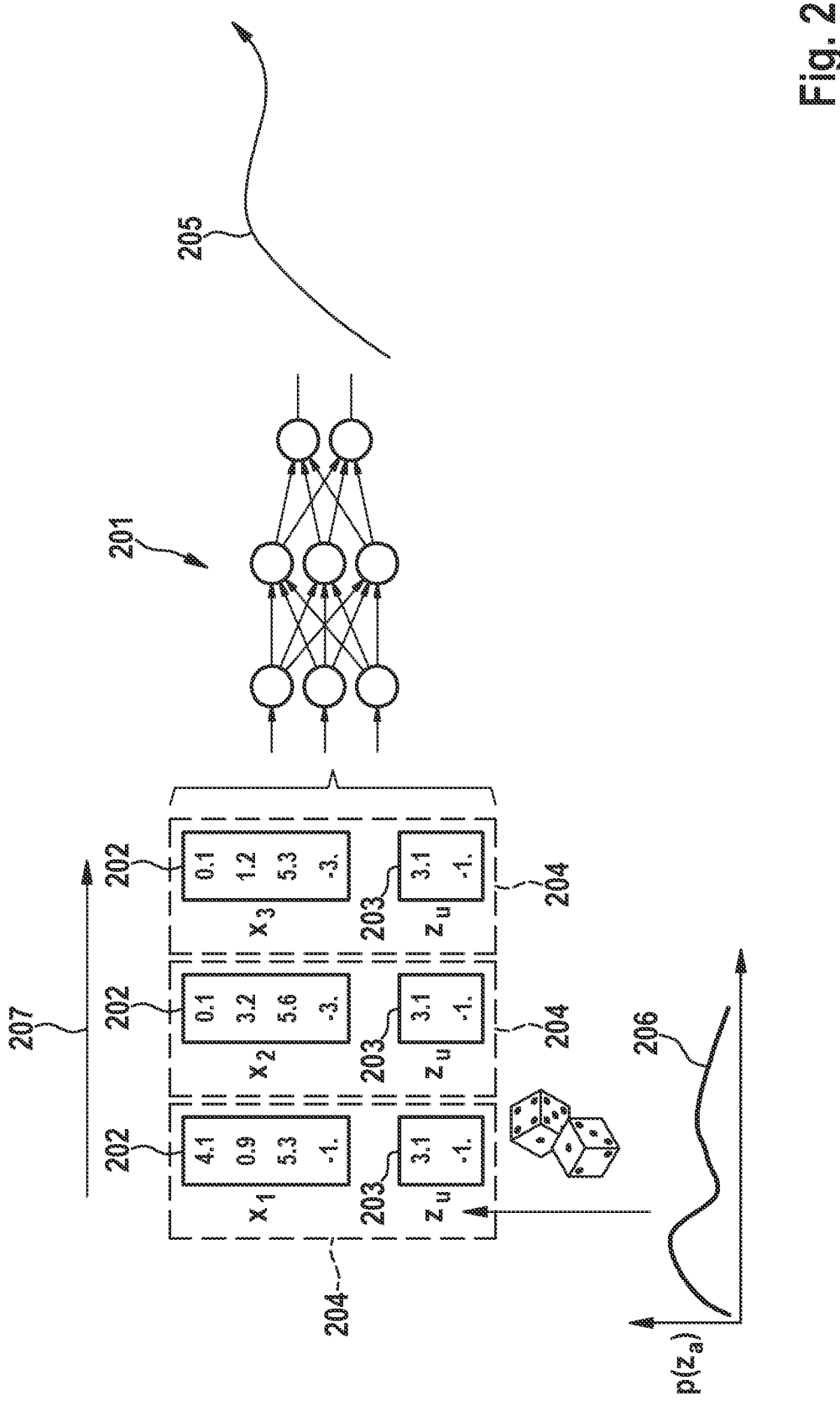
FIG. 2 shows an example of a prediction using a neural network, according to an example embodiment of the present invention.

FIG. 2 shows an example of a prediction using a neural network 201.

The input data are state vectors 202 that describe the state of an agent for which a trajectory is to be predicted. Each state vector is expanded by a value 203 of $z_a$. The resulting expanded state vectors 204 form the input of neural network 201; in this example, neural network 201 receives a set (i.e. a time series 207) of such expanded state vectors 204, and from this predicts a trajectory 205; that is, the output of the neural network here is an indication of trajectory 205. For a current prediction (or also for the agent), value 203 of $z_a$ is sampled from a probability distribution, and is then constant for all state vectors 204 that are used for the current prediction. It can also be held constant for all predictions that relate to the same agent, or can also be newly sampled for each prediction (even if it relates to the same agent).

For the training (of neural network 201 together with probability distribution 206), first (start) values for $z_a$ are randomly sampled for each agent for which there are training examples in the training data, and the $z_a$ are trained (individually for each agent) together with the actual parameters (i.e. the network parameters, typically the weights) of neural network 201. Here, depending on the application, different loss functions, such as cross-entropy loss, may be used. After this training, for each agent for which there are training examples in the training data the value of $z_a$ codes the individual behavior of the agent. In order to also be able to predict behavior for new agents, i.e. those for which there are no training examples in the training data, the probability distribution 206 of the variables $z_a$, designated $g(z_a)$, is modelled.

For this purpose, any methods for fitting a probability distribution to data may be used that yield a probability distribution that makes it possible to efficiently sample values of $z_a$, e.g. a Gaussian mixture model. The resulting model $g(z_a)$ can then be used to sample values of $z_a$ for new agents and to predict their behavior using $f_\theta(\bar{x})$.

Figure 3:
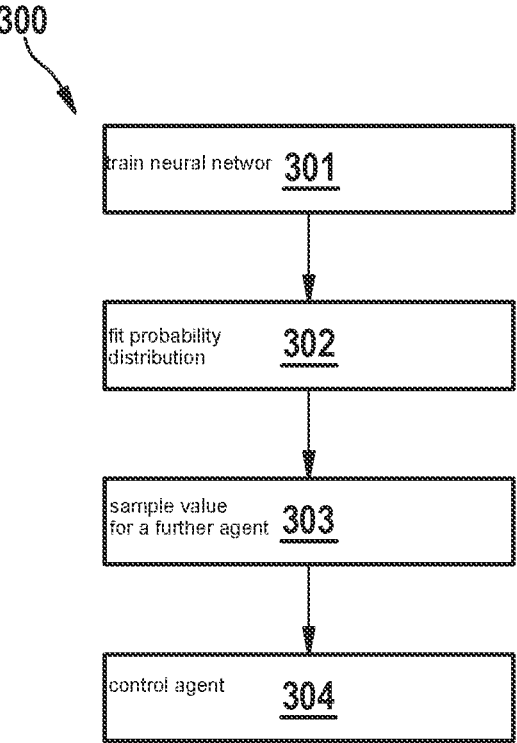
FIG. 3 shows a flow diagram of a method for controlling a robot to pick up and inspect an object according to a specific example embodiment of the present invention.

According to various specific embodiments, the following is thus carried out for the training and the execution of the prediction:

Training
1. Initialization of the neural networks $f_\theta(\bar{x})$
2. For all agents a in the training data set, an initial variable $z_a$ is created
3. Training of the network and of the variables $z_a$
   3.1. Training for a number of epochs or until an abort criterion is met
       3.1.1. Drawing a minibatch $\{(x,y)\}$ from the training data
       3.1.2. Enlarging the data points x with the value of the variables $z_a$ for the associated agent $\bar{x}=[x,z_a]$ in order to produce an enlarged minibatch $\{(\bar{x},y)\}$
       3.1.3. Optimization step with regard to $\theta$ and $\{z_a\}$ for a loss $L(f_\theta(\bar{x}),y)$
4. Collecting the trained values of the variables $\{z_a\}$
5. Training a probability distribution model $g(z_a)$ on the collected data $\{z_a\}$ Realization for the Prediction
1. Drawing a value for $z_a$ from the trained probability distribution model $g(z_a)$ for a further agent
2. Evaluation of the actual prediction model $f_\theta$ for the expanded input $\bar{x}=[x,z_a,]$ results in the prediction y FIG. 3 shows a flow diagram 300 that shows a method for controlling a robot to pick up and inspect an object according to a specific embodiment.

In 301, a neural network is trained using training data that contain, for a multiplicity of agents, examples of a behavior of the agents, the output of the neural network including a prediction of a behavior and being a function of network parameters that are trained in common for all training data and that are a function of a further parameter that is trained individually (i.e. specifically) for each of the agents of the multiplicity of agents.

In 302, a probability distribution is fitted to the values of the further parameter for the agents that result from the training.

In 303, a value for a further agent in the environment of the agent is sampled (i.e. drawn) from the probability distribution.

In 304, the agent is controlled taking into account a prediction of the method of the further agent that the neural network outputs for the sampled value for the further agent.

The method of FIG. 3 can be carried out by one or more computers having one or more data processing units. The term "data processing unit" can be understood as any type of entity that enables the processing of data or signals. The data or signals can for example be treated according to at least one (i.e. one or more than one) specific function that is carried out by the data processing unit. A data processing unit can include an analog circuit, a digital circuit, a logic circuit, a microprocessor, a microcontroller, a central unit (CPU), a graphics processing unit (GPU), a digital signal processor (DSP,) an integrated circuit of a programmable gate array (FPGA), or any combination thereof, or may be fashioned therefrom. Any other manner of implementing the respective functions described in more detail herein can also be understood as a data processing unit or logic circuit system. One or more of the method steps described here in detail can be executed (e.g. implemented) by a data processing unit through one or more specific functions that are carried out by the data processing unit.

Various specific embodiments can receive and use sensor signals from various sensors, such as video, radar, lidar, ultrasound, movement, acceleration, heat mapping, etc., for example in order to provide sensor data for the detection of objects (i.e. other agents) and as input for the neural network for the prediction of the behavior.

The neural network can supply, as output, values from a continuous value range or a plurality of values from a continuous value range. It can for example carry out a regression in relation to the future behavior of human agents that it represents in its output by one or more positions, trajectories, locations, etc.

Specific embodiments can be used to train a machine learning system and to control an agent, e.g. a physical system such as a robot or a vehicle. In particular, specific embodiments are applicable to the controlling and monitoring of the carrying out of manipulation tasks, e.g. in assembly lines.

The controlled agent can be a robot device, i.e., a control signal can be produced for a robot device. The term "robot device" can be understood as relating to any physical system (having a mechanical part whose movement is controlled), such as a computer-controlled machine, a vehicle, a household appliance, an electric tool, a manufacturing machine, a personal assistant, or an access control system. A control rule for the physical system is learned and the physical system is then correspondingly controlled.

In the case of an autonomous vehicle or mobile robot, the robot device detects pedestrians (e.g., using lidar sensors), and calculates their position and speed. The respective control device (e.g., vehicle control device 102) samples a potential preference for each pedestrian, and uses the trained prediction model (i.e., the trained neural network) to predict its future trajectory from the current position of the pedestrian.

The described approaches can however also be applied to any type of agents (e.g., including to an agent that is only simulated and does not physically exist).

Although specific embodiments have been presented and described herein, the person skilled in the relevant art will recognize that the specific embodiments shown and described may be exchanged for a multiplicity of alternative and/or equivalent implementations without departing from the scope of protection of the present invention. The present application is intended to cover any adaptations or variations of the specific embodiments discussed herein. Therefore, the intention is that the present invention be limited only by the claims and the equivalents thereof.

What is claimed is:

1. A method for controlling an agent, comprising the following steps:

training a neural network using training data that contain, for a multiplicity of agents, examples of a behavior of the agents, an output of the neural network including a prediction of a behavior and being a function of network parameters that are trained in common for all training data, and being a function of a further parameter that is trained individually for each of the agents of the multiplicity of agents;

fitting of a probability distribution to values of the further parameter for the agents that result from the training;

sampling a value from a probability distribution for a further agent in an environment of the agent; and controlling the agent, taking into account a prediction of a behavior of the further agent that the neural network outputs for the sampled value for the further agent.

2. The method as recited in claim 1, wherein the neural network is trained to map an input of the neural network onto a prediction of a behavior of an agent, the input of the neural network including state information of the agent for which the neural network is to predict the behavior, and including the further parameter.

3. The method as recited in claim 2, wherein the input of the neural network includes state information about a control scenario in which the behavior of the agent is to be predicted.

4. The method as recited in claim 1, wherein the probability distribution is a Gaussian mixture model.

5. The method as recited in claim 1, wherein the training of the network parameters and of the further parameter is by adapting the network parameters and the further parameter in to minimize a loss between the examples of the behavior of the agents and the behavior respectively predicted by the neural network.

6. A control device configured to control an agent, the control device configured to:

train a neural network using training data that contain, for a multiplicity of agents, examples of a behavior of the agents, an output of the neural network including a prediction of a behavior and being a function of network parameters that are trained in common for all training data, and being a function of a further parameter that is trained individually for each of the agents of the multiplicity of agents;

fit of a probability distribution to values of the further parameter for the agents that result from the training;

sample a value from a probability distribution for a further agent in an environment of the agent; and control the agent, taking into account a prediction of a behavior of the further agent that the neural network outputs for the sampled value for the further agent.

7. A non-transitory computer-readable medium on which are stored commands for controlling an agent, the commands, when executed by a processor, causing the processor to perform the following steps:

training a neural network using training data that contain, for a multiplicity of agents, examples of a behavior of the agents, an output of the neural network including a prediction of a behavior and being a function of network parameters that are trained in common for all training data, and being a function of a further param-
eter that is trained individually for each of the agents of
the multiplicity of agents;

fitting of a probability distribution to values of the further
parameter for the agents that result from the training;

sampling a value from a probability distribution for a
further agent in an environment of the agent; and controlling the agent, taking into account a prediction of
a behavior of the further agent that the neural network
outputs for the sampled value for the further agent.

* * * * *